United States Patent [19]
Anetsberger

[11] Patent Number: 5,277,569
[45] Date of Patent: Jan. 11, 1994

[54] DOUGH ROUNDER

[75] Inventor: Richard J. Anetsberger, Northbrook, Ill.

[73] Assignees: Anetsberger Brothers, Inc, Northbrook, Ill.; Little Caesars Enterprises, Inc., Detroit, Mich.

[21] Appl. No.: 883,283

[22] Filed: May 14, 1992

[51] Int. Cl.[5] .................................... A21C 11/00
[52] U.S. Cl. .................................... 425/153; 425/155; 425/169; 425/332; 425/425; 425/429; 426/512
[58] Field of Search ............ 425/151, 153, 155, 156, 425/157, 169, 212, 332, 333, 402, 425, 429, 430, DIG. 45; 426/512

[56] References Cited

U.S. PATENT DOCUMENTS

| 640,944 | 1/1900 | Pointon et al. | 425/333 |
|---|---|---|---|
| 901,577 | 10/1908 | Williams | 425/333 |
| 1,044,803 | 11/1912 | Moores | 425/333 |
| 1,094,966 | 4/1914 | Barker | 425/333 |
| 1,103,281 | 7/1914 | Frischmann | 425/333 |
| 1,244,801 | 10/1917 | Van Houten | 425/333 |
| 1,570,525 | 10/1922 | Rippin | 425/333 |
| 2,623,478 | 12/1952 | Verheij | 425/333 |
| 2,790,397 | 4/1957 | Winkler | 425/333 |
| 3,254,979 | 6/1966 | Knapp et al. | 425/332 |
| 3,899,275 | 8/1975 | Atwood | 425/333 |
| 4,286,939 | 9/1981 | Benier | 425/333 |
| 4,427,357 | 1/1984 | Anderson | 425/333 |
| 4,511,318 | 4/1985 | Kolodesh et al. | 425/332 |
| 4,668,174 | 5/1987 | Williams | 425/333 |
| 4,711,425 | 12/1987 | Spiel et al. | 425/434 |
| 4,746,282 | 5/1988 | Niesson et al. | 425/333 |
| 4,984,978 | 1/1991 | Beatty | 425/332 |
| 5,110,610 | 5/1992 | Cummins | 425/332 |

FOREIGN PATENT DOCUMENTS 61-242537 10/1986 Japan .................... 425/333

Primary Examiner—Jay H. Woo
Assistant Examiner—Khanh P. Nguyen
Attorney, Agent, or Firm—McCaleb, Lucas & Brugman

[57] ABSTRACT

A dough rounder machine for kneading and forming dough and similar plastic masses into uniformly shaped form in which the dough is placed in an annular die driven by eccentric drive means over a stationary horizontal tray table whereby to move the die in a generally circular orbit over the table. Dough placed in the die is overcovered by a weighted cover which orbits with the die and is gravity actuated to exert vertical force on the dough. Engagement of the dough with the table, orbiting die and cover serves to knead and roll the dough into a substantially spherical mass, the texture and density of which is regulatable by the cover weight and movement of the die over a limited time interval.

10 Claims, 8 Drawing Sheets

DOUGH ROUNDER

BACKGROUND

This invention relates to the art of dough handling and more particularly to improvements in machines for eliminating the task of manually rolling, kneading and forming dough or similar plastic materials into like shaped and sized balls of desired uniform texture.

Previously known machines developed for the purpose of mechanically forming and kneading batches of bread dough and the like have not proven to be particularly successful in practice due to their high cost, relatively complex and cumbersome structural make up, limited production capacity and slow production speed further marked by characteristic difficulties in cleaning the dough handling mechanism in an efficient and convenient manner. Furthermore, most dough rounders heretofore developed do not readily lend themselves to counter top installations, demanded in fast food restaurants, such as the commercially familiar pizza parlors or similar facilities, having limited food preparation space.

BRIEF SUMMARY OF THE INVENTION

A dough rounder machine capable of being operatively floor or counter top mounted comprising a frame supporting an outer housing, motorized drive means supported by the frame, a horizontal tray table mounted on the frame and capable of under supporting one or more cylindrical open ended dough forming dies coupled to the drive means which is operable to impart circular orbital movement to the dies. The open upper end of each die is overhung by a weighted cover means which follows the die's orbital movement and is engageable with dough placed in the die's open interior. A floating support system carries the cover means for vertical movement relative to the die and table so that each cover means is capable of following vertical movement of its associated dough batch as it is formed into a generally spherical ball in response to its engagement with the table, cover means and interior walls of the moving die. Such arrangement serves to knead and form the dough into the desired spherical ball or shape. The texture and density of the ball shaped dough is regulated by the speed of the die's orbital movement and the length of time in which the die engages the dough in conjunction with the weight exerted on the dough by the cover means. A protective safety cover encases the moving working parts of the machine during operation to ensure operator safety and an exterior housing is supported on the frame.

It is an important object of this invention to provide an improved compact dough rounder of simplified structure.

It is another object of this invention to provide an improved dough rounder as aforesaid that is readily adapted for counter top installation and is capable of efficiently processing dough into uniformly textured spherical shape, ready for proofing.

Another important object of this invention is to provide a dough rounder in which the dough handling and engaging elements or members can be readily disassembled and removed from the machine for cleaning purposes.

Still another important object of this invention is to provide a dough rounder that incorporates a protective safety cover over the moving parts thereof to insure operator safety.

It is a further object of this invention to provide a dough rounder of simplified and efficient structure, capable of quickly processing various size dough batches.

A still additional object of this invention is to provide a dough rounder mechanism of simplified and efficient structure which employs a generally cylindrical die for encircling a batch of dough to be kneaded and formed; the die being moved in a circular orbit over a stationary planar surface for a regulated time period during which the dough therein is engaged by the cylindrical side walls of the die, the planar surface and an over disposed cover means to efficiently knead and form the dough into a generally spherical ball of desired texture and density.

Having described this invention, the above and further objects, features and advantages thereof will be understood and recognized by those of skill in the art from the following detailed description of a preferred embodiment thereof illustrated in the accompanying drawings and representing the best mode presently contemplated for enabling those skilled in the art to practice this invention.

DESCRIPTION OF THE PREFERRED EMBODIMENT

Figure 1:
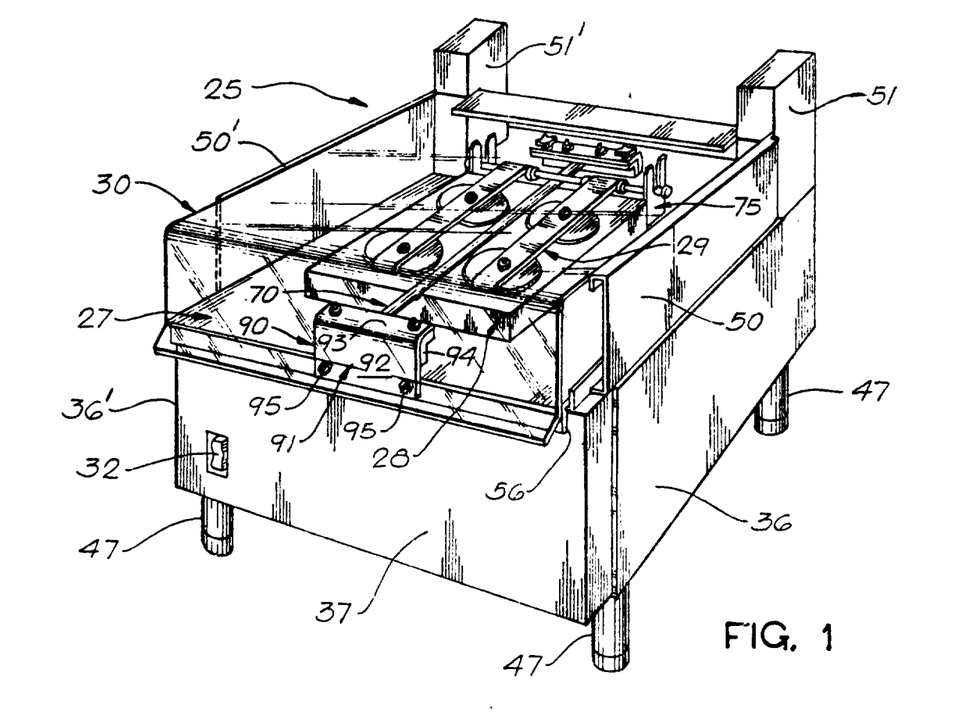
FIG. 1 is a frontal perspective of a dough rounder machine according to this invention.
Figure 2:
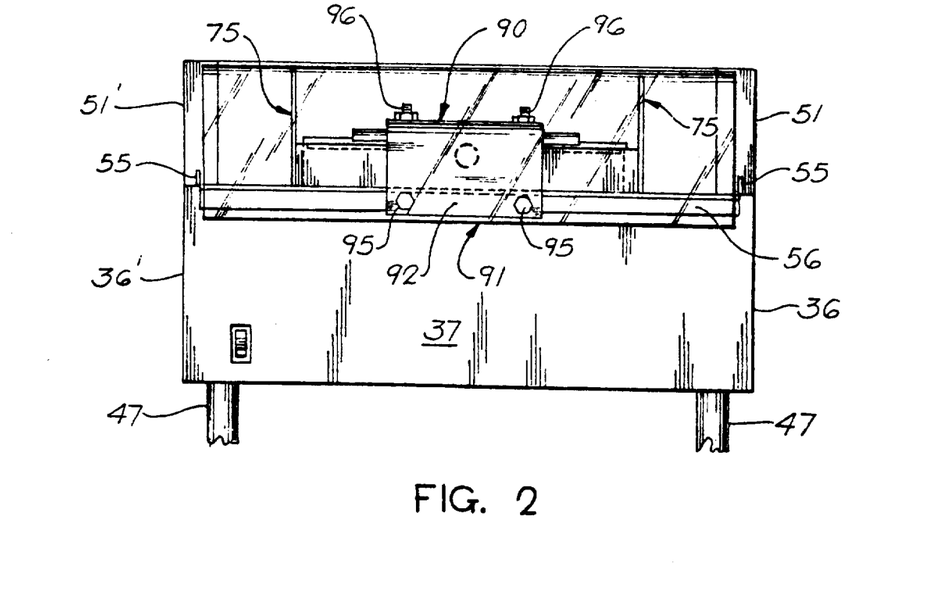
FIG. 2 is a front elevation thereof.

Turning now to the features and particulars of the preferred embodiment illustrated in the drawings, initial reference is made to FIGS. 1 and 2 wherein a counter top mountable dough rounder in accordance with the teachings and concepts of this invention are illustrated, it being understood that although the description which follows concerns a counter top embodiment as the preferred mode of practicing this invention, it is fully contemplated that a machine of this order may be floor mounted as well.

As best illustrated in perspective FIG. 1, the machine indicated generally at 25 therein comprises a stationary, substantially rectangular housing assembly 26 supported by an interior frame work (not shown in FIG. 1) and carrying a substantially horizontal planar tray table 27 over its upper side which undersupports a centrally disposed rectangular and relatively thick die means 28 having a plurality of cylindrical upper ends of the die through openings. Suitable moveable cover means 29 serve to cover the die openings for reasons which will be explained presently. A clear plastic or see through safety cover 30 is hingedly secured in an enclosing fashion over the die means, cover means and tray table to guard the user from the working elements of the machine.

As will appear later herein the die means 28 and the cover means 29 are actuated in circular orbital fashion by motorized drive means 31 mounted within the housing 26 and operatively controlled by an on and off switch 32 and timer controlled circuitry which includes a safety switch responsive to the raising and lowering movements of cover 30 whereby the drive means is deenergized whenever the safety cover is raised to prevent the user/operator from encountering any moving parts when he is loading or unloading the machine.

With specific reference now to FIGS. 1-4 of the drawings, the features of housing assembly 26 will be recognized as including two parallel planar side walls 36, 36' a transversely related front wall 37 and a planar rear wall 38 paralleling front wall 37. The four walls 36, 36', 37 and 38 are welded to four vertical angle support members 40, 41 disposed at the four corners of the housing and interjoined by elongated angle support members 42 along the bottom edges of the two side walls 36, 36' C-channel members 43, 43 extend between the front corner supports 41, 41 and a similar channel member 44 extends between the upper ends of rear corner supports 40, 40. A wide support channel member 45 is mounted across the bottom rear portion of the housing to extend between the two lateral support angles 42, 42. The side and end walls are formed with inwardly turned right angle flanges along their top and bottom edge for welded connection with the frame support members and legs 47 are provided adjacent the four corners of the housing to support the machine. Optionally such legs may be eliminated and the unit supported directly on a countertop.

In addition to the several wall members previously described, the housing structure also includes a pair of lateral guards or side wall extensions 50, 50' which border the lateral sides of the tray table 27 and extend upwardly along the upper margins of side walls 36, 36' for connection with a pair of hollow rectangular housings 51, 51' projecting upwardly at the upper rear corners of the machine for purposes which will appear hereinafter. It will be noted that the transparent safety cover 30 is mounted between the two walls 50, 50' which serve to close open sides of the safety cover and to guide the cover in its vertical, pivotal movement. With reference now to FIGS. 5-10 of the drawings, the particulars of the tray table, the die means and cover means 27-29 will be described in greater particular.

Figure 5:
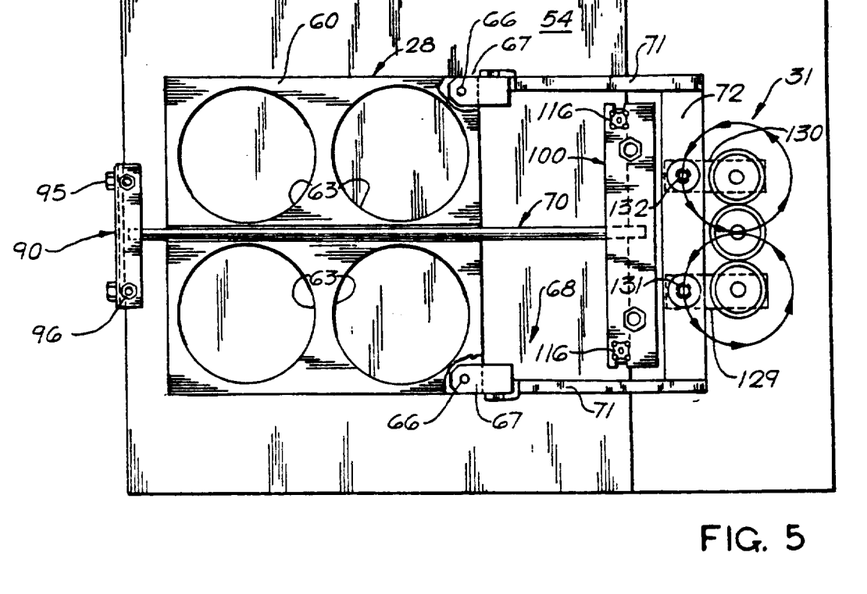
FIG. 5 is a top plan view thereof with safety cover removed.
Figure 6:
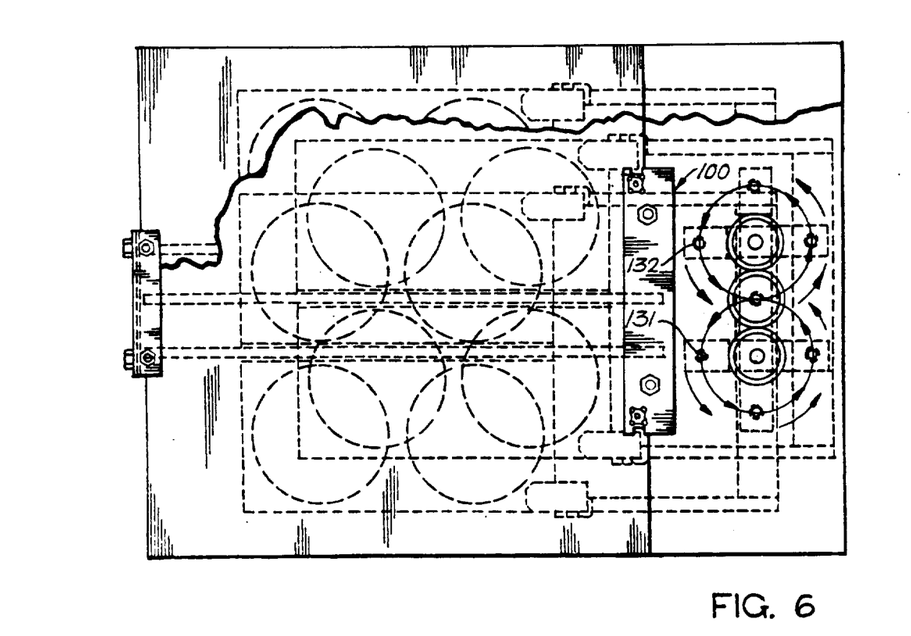
FIG. 6 is another top plan view thereof with portions of the safety cover broken away and indicating operational movement positions of the dough forming dies and associated drive means.

As previously noted and as illustrated in FIGS. 5 and 6, die means 28 is operatively supported on top of the horizontally disposed tray table 27 for horizontal orbital movement thereover in a manner which will be detailed later herein (see FIG. 6). It is important that the tray table 27 be relatively rigid and planar and it may constitute a unitary casting of lightweight metal, such as cast aluminum magnesium alloy, having the upper surface thereof suitably machined to a planar condition.

Figure 8:
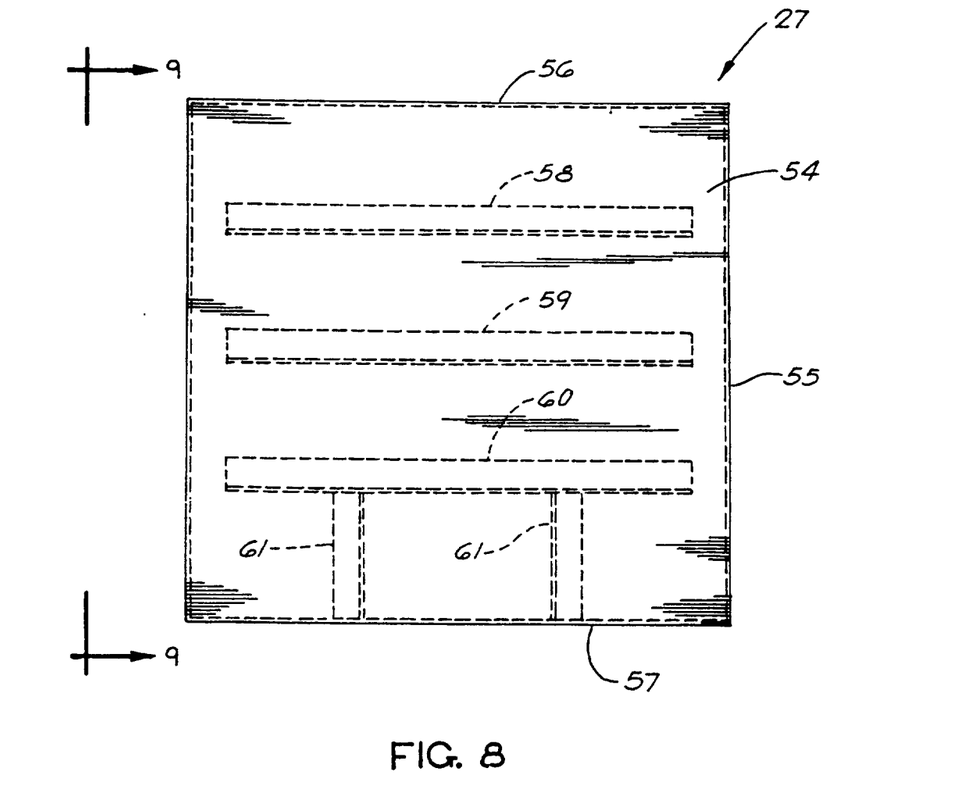
FIG. 8 is a top plan view of the tray table embodied in the machine of FIG. 1.
Figure 9:
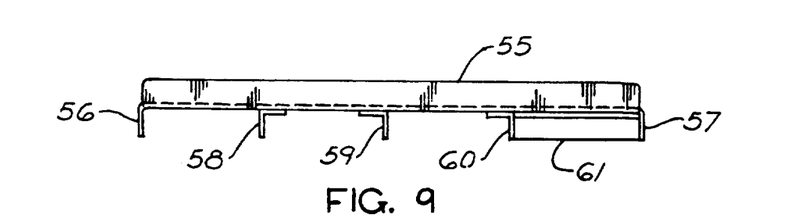
FIG. 9 is a side elevation of the tray table.
Figure 10:
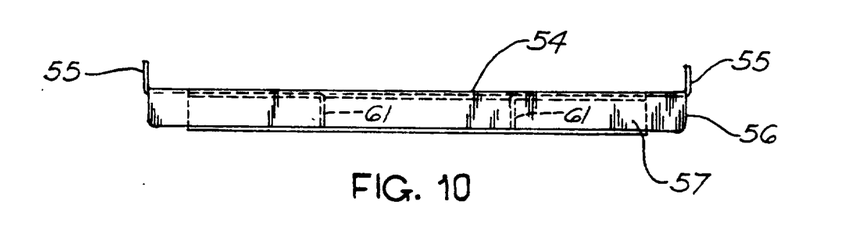
FIG. 10 is a front elevation thereof.

As herein illustrated the table 27 is constructed of sheet stainless steel to provide a generally square table top 54 presenting a planar upper surface to the underside of die means 28. As best shown in FIGS. 8-10 of the drawings, the tray table is constructed with the planar top 54 thereof bordered on two sides by upwardly turned right angularly related flange portions 55, 55 while the front or leading edge and the rear edge of the platform portion 54 are provided with downwardly turned skirt portions 56 and 57, respectively. Rigidity is provided to the table top 54 by a plurality of transversely extending angle braces 58, 59 and 60 by two shorter angle iron braces 61, 61 extending transversely between the brace 60 and the rearward skirt 57. The several braces 59-61 are affixed to the table top 54 as by spot welding or similar fastening means and provide in conjunction with the upwardly and downwardly turned portions 55, 56 and 57 thereof a rigid table structure, as required. In assembly the table structure is mounted over the upper end of the box-like housing with the frontal lip 56 thereof overhanging the upper margin of the front wall 37 and the lateral or side margins thereof resting atop the inwardly turned flanges at the upper marginal edges of the side walls 36, 36' as previously noted.

Turning now to the features of the die means 28, reference is made to FIGS. 5-7, 13 and 14 of the drawings from which it will be recognized that the die means comprises a generally square thick die body 60 which can be cast of lightweight metal, such as magnesium aluminum alloy. Preferably, as in the herein illustrated instance, the die body is of rigid, dense plastic, such as UHMW Polyethylene or its equivalent having parallel upper and lower surfaces 61 and 62 (see FIG. 14) formulated with four transversely extending cylindrical die openings 63. An upwardly opening transversely extending semi-cylindrical guide channel 64, aligned on the central axis of the body 60 for reception of a guide means, is also provided as will be described more fully hereinafter.

Figure 11:
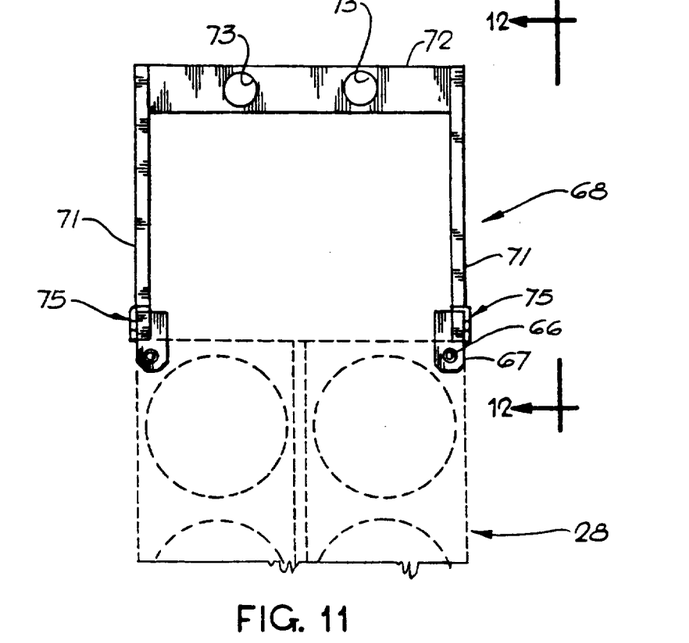
FIG. 11 is a top plan view of the drive yoke and indicating the associated die assembly in dotted lines.
Figures 12, 13, 14:
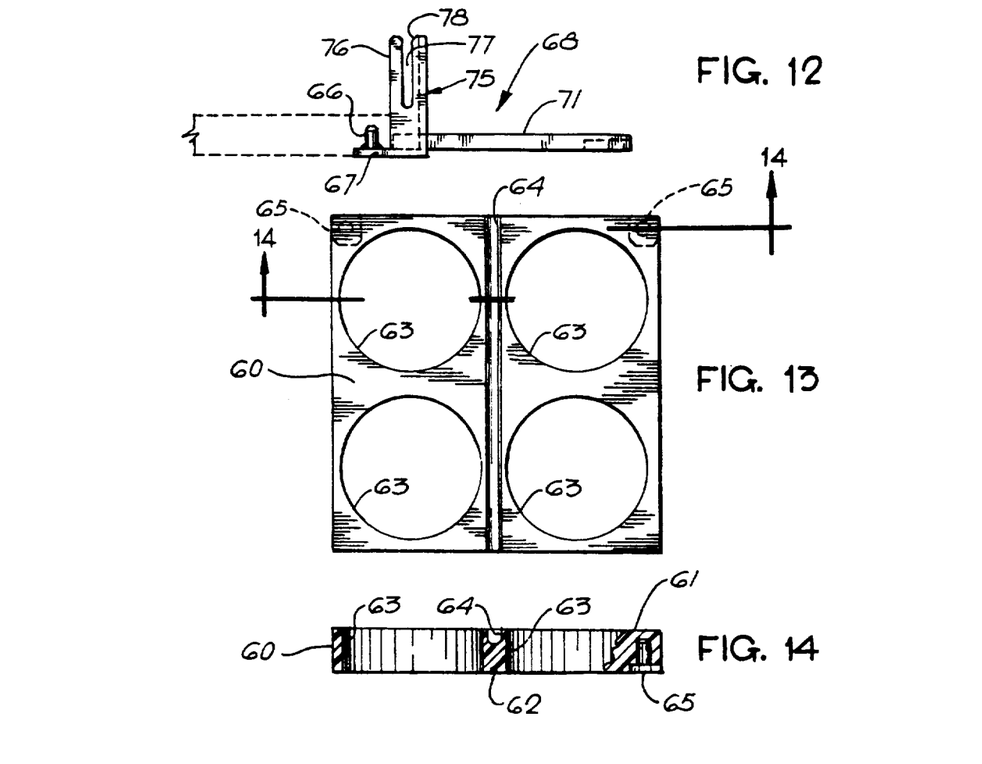
FIG. 12 is a side elevation of the drive yoke taken substantially from vantage line 12—12 of FIG. 11 and looking in the direction of the arrows thereon.
FIG. 13 is a top plan view of the die assembly associated with the drive yoke of FIGS. 11 and 12.
FIG. 14 is a cross sectional view taken along vantage line 14—14 of FIG. 13 and looking in the direction of the arrows thereon.

The lower rearward corners of the die body are suitably recessed and provided with upwardly extending socket openings 65 for reception of connector pins 66 projecting upwardly from supporting platform portions 67, 67 associated with a drive yoke, indicated generally at 68 in FIGS. 11 and 12. This arrangement provides detachable interconnection between the drive yoke and the die means 28.

A cylindrical guide rod 70 is received in the semi-cylindrical channel 64 of the die body for guiding the later rectilinearly along transverse linear axes as will be amplified in description that follows.

It will be appreciated that the several die cavities provided by the cylindrical openings 63 may be varied in diameter and depth, depending on the size of the dough batch to be formed therein by varying the thickness of the die body 60. Further, it will be recognized and appreciated that although the herein illustrated embodiment employs four die openings in the die body 60, the number of such openings may be varied, depending on the desired production capacity and size of the dough rounding machine in accordance with this invention.

With reference now to FIGS. 4, 5–7, 11 and 12, the particulars of the drive yoke 68 will now be set forth in greater detail.

As heretofore noted the drive yoke is detachably secured via the pins 66 to the rearward end of the die body 60 so that the latter may be detachably removed from the drive yoke for cleaning purposes inasmuch as the later remains affixed to the drive means 31 at least in a semi-permanent fashion and does not lend itself to ready disassembly. As shown in FIGS. 5, 11 and 12, the drive yoke 68 includes a pair of laterally spaced parallel drive arms 71, 71 which are interconnected at the operationally rearward ends thereof by a cross bar 72 of relatively greater width than the drive arms 71, 71 and is distinguished by a pair of coaxially aligned, laterally spaced openings 73, 73 for connection with the drive means 31 as will appear hereinafter. The rear ends of drive arms 71 are rigidly affixed to the outer ends of the member 72 as by welding while the opposite or outer ends of each arm 71 carries the pin support platforms 67 which are rigidly affixed to arms 71 and extend forwardly therefrom to support and present the upstanding connector pins 66.

In addition to the platforms 67 and pins 66, the outer ends of arms 71 also support a pair of parallel spaced, upstanding guide brackets 75, each of generally L-shaped cross sectional configuration and having an upstanding planar body 76 distinguished by a centrally located and axially oriented slotted opening 77 having an open upper end 78 (see FIG. 12). Such slotted openings 77 are registeringly aligned opposite one another and are adapted to receive the opposite ends of a cylindrical guide shaft 80, associated with the die cover means 29; such slotted openings 77 being of a width sufficient to permit the rod 80 to move freely up and along the length thereof and thus provide floating connection means between cover means 29 and the drive yoke during the operation of the dough rounder.

Figures 7, 24:
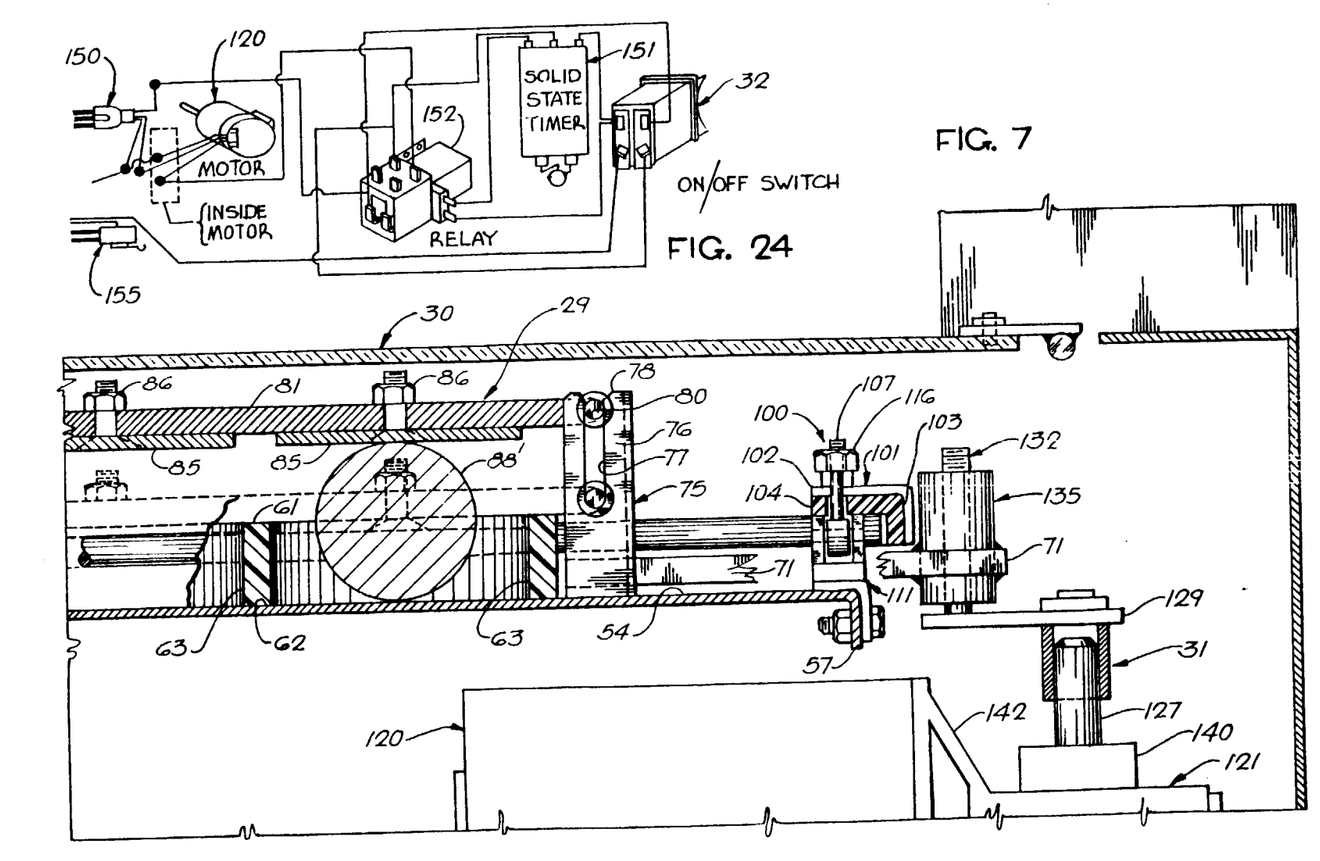
FIG. 7 is a partial enlarged cross sectional view taken substantially along the longitudinal axis of the machine shown in FIG. 1, with portions thereof broken away.
FIG. 24 is a schematic diagram of the central circuit for the motorized drive means.
Figures 15, 16:
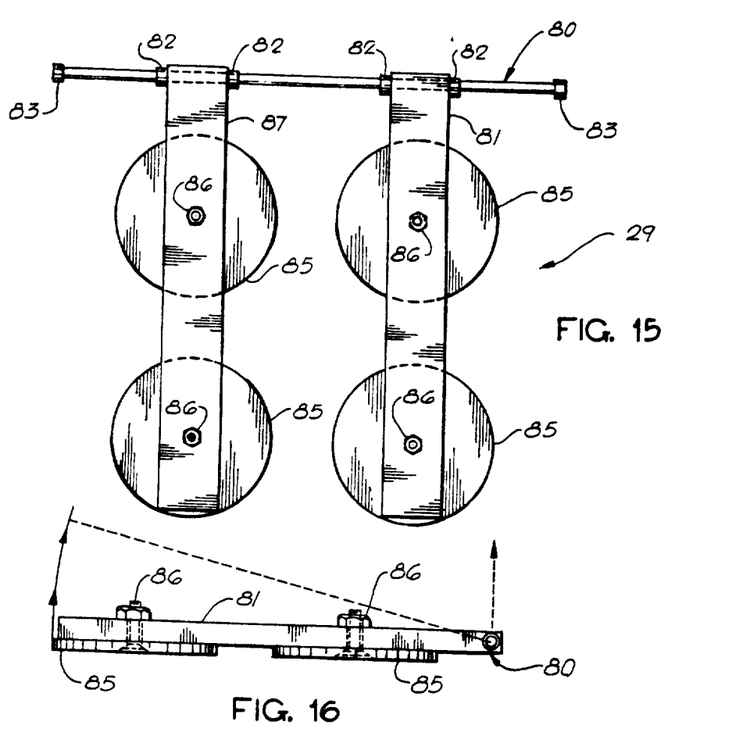
FIG. 15 is a top plan view of the die cover means associated with die assembly of FIG. 13.
FIG. 16 is a side elevation of the cover means shown in FIG. 15 and diagrammatically indicating pivotal and vertical operational movements thereof.

With reference now to FIGS. 7, 15 and 16, the features of die cover means 29 will be set forth.

As best shown in FIG. 15 the guide shaft 80 carries a pair of wide metal support arms 81, 81 which are rotatably joined at one end to shaft 80 and held in spaced axial positions thereon by cylindrical ferrals 82, 82 adapted to be locked in place to locate the arms so that the lengthwise axis of each is axially aligned with the centers of two die openings 63 with which it is related. It further will be noted that the outer ends of the shaft 80 are also equipped with additional ferrals 83, which fit outside of the brackets 75 in operation to prevent axial shifting of the shaft 80. Each of the arms 81 is pivotal about shaft 80, as indicated in FIG. 16 and each arm is so moveable independently of the other.

Figure 4:
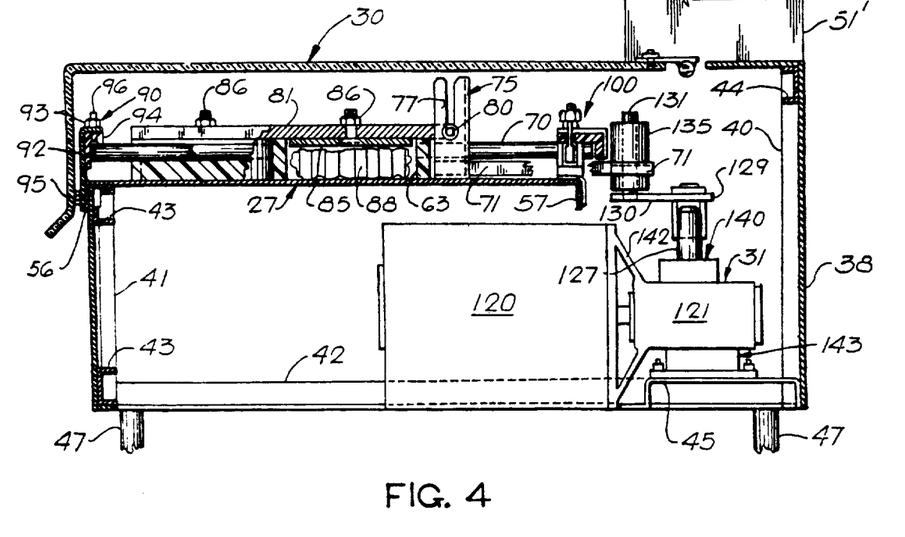
FIG. 4 is a partial cross sectional view taken substantially along the longitudinal axis of the machine shown in FIG. 1, with parts shown in full elevation.

Importantly it, will be recognized that each of the arms 81 carries a pair of disc-like cover members 85, 85 attached to the respective arms by centrally disposed bolts 86 having countersunk heads as indicated whereby the covers are securely mounted on their respective arms 81 and are aligned in operation to overcover the open upper ends of the cylindrical die openings 63, as illustrated in FIGS. 1, 4 and 7. From FIG. 4 it will be noted that batches of dough 88 are shown in the die openings 63 at the start of a dough forming operation. It also will be noted that the die covers, which are of slightly smaller diameter than that of die openings 63 have been lowered to substantially close the open upper end of such openings. As such the covers will generally contact the underdisposed batch of dough 88 in each of the dies. As the kneading operation progresses in accordance with the functioning of the dough rounder of this invention, each batch of dough 88 increases in vertical dimension and eventually becomes a generally spherical ball as shown at 88' in FIG. 7 of the drawings. Due to the floating support system for the cover means 29 provided by shaft 80 and slotted brackets 75, the individual covers 85 are adapted to move with the diametrically changing dimension of the rounded dough following the same upwardly or vertically as it grows from a relatively flat mass to a substantially spherical ball. In this respect the weight of the cover means serves to materially assist in kneading, rolling and forming the dough.

It will be recalled that the die means 28 includes a linear guide rod 70 which extends across the upper side of the die body 60 and along the central axis thereof to guide such body rectilinearly as it is orbitally driven over the tray table 27 by drive means 31. Such rod 70 does not reciprocate along its lengthwise axis although the die body 60 does move along the lengthwise axis of the rod as it courses its orbital path. At the same time the die body is also driven at right angles to the lengthwise axis of rod 70. In order to effect this desired guiding of the die means, suitable means for permitting lateral movement of the guide rod as it follows lateral movements of the die body along its orbital path is required.

To that end initial reference is made to FIGS. 1, 2 and 4 wherein first or front guide bearing assembly 90 is illustrated. It will be noted that assembly 90 is located over the outer or forward end of rod 70 adjacent the frontal panel 37 of the machine housing and comprises an angle bracket 91 having a planar body 92 and a planar right angularly related upper flange 93 which is disposed in overhanging parallelism with the tray table 27. The flange 93 which is at the upper end of the body 92 carries an L-shaped elongated bearing block 94 which conforms to the angular configuration of the bracket 91 and engages the outer end of the guide rod 70 as shown in FIG. 4. Preferably the bearing block 94 is made of high density polyethylene and serves to engage the extreme outer end of the rod 70 in bearing relationship as well as the adjacent end portions of the rod 70, permitting the latter to move laterally along the length of the guide block in accordance with the lateral movements of the die means. It will be noted that from FIG. 1 in particular that the bearing assembly 90 is located on the central axis of the tray table and is held in that position by a pair of bolt fasteners 95, 95 which extend through lip 56 of the tray table and the frontal wall 37 of the housing thereby anchoring the front of the tray table to the wall 37. Additional bolt fasteners 96 pass through the upper flange 93 and to lock the bearing means 94 thereto.

Operating in conjunction with the front bearing assembly 70, is a rear bearing assembly 100, best shown in FIGS. 17-20. As is there shown, the assembly 100 comprises a right angular metal bracket 101, similar to the front bearing assembly bracket 91, having a main body 102 and a right angularly related flange 103. A plastic bearing block 104, formed to the configuration of the bracket 101 is carried on the inside thereof and is held to the bracket 101 by means of countersunk bolt fasteners 105 which pass through the body 101 of the bracket and bearing block 104. This bearing means, similar to the front bearing assembly previously described, engages the rear or innermost inner end of rod 70 over the upper side of the latter and also provides an end barrier thereto for limiting axial movement of the rod during operation.

With this arrangement of front and rear bearing assemblies, the rod 70 is maintained in a substantially fixed axial position permitting only minor axial movement thereof, while at the same time the rod is free to move laterally beneath the overhanging portions of the bearing blocks either with sliding or rolling movement in response to lateral movement of the die means as it is orbitally driven over the tray table.

If it were not for the fact that a machine of this character must be cleaned daily, if not more frequently, to maintain sanitation, the operational or assembled relationship of the die means and tray table including the bearing assemblies associated with the guide rod 70 could be more or less permanent or semi-permanent permitting only infrequent disassembly of parts. However, that is not the case and to that end a quick and convenient means for removing the die assembly and the die cover means is provided herein.

Figures 17, 18:
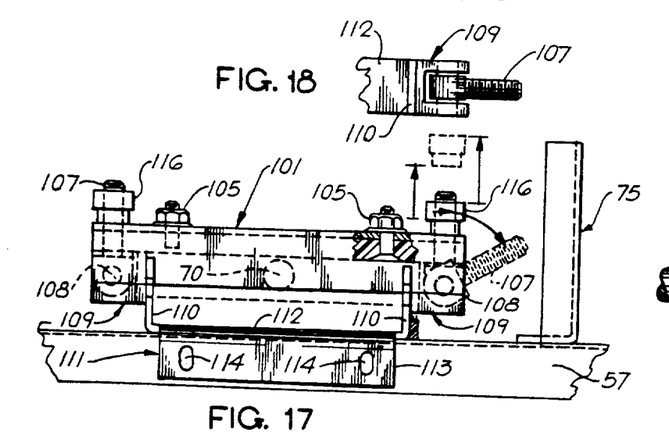
FIG. 17 is an enlarged rear elevation of the rear bearing assembly and associated mounting means with portions thereof broken away.
FIG. 18 is a partial top plan view of a clevis connector for removeably attaching the bearing assembly of FIG. 17 to the tray table.
Figure 19:
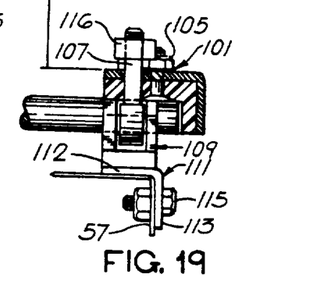
FIG. 19 is a partial end elevation of the assembly shown in FIG. 17 with parts thereof in full elevation.
Figure 20:
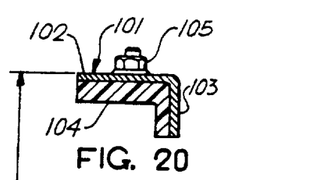
FIG. 20 is an end elevation of the rear bearing assembly shown in FIG. 17.

As shown best in FIGS. 17, 18 and 19, the bearing assembly 101 and more particularly bracket 101 is somewhat elongated over that of the corresponding front bearing assembly 91; the outer ends of the upper flange 102 thereof being suitably slotted for the reception of a pair of pivotal clevis swing bolts or tie downs 107 which are pivotally secured on pins 108 press fitted to and extending transversely between parallel arms of a bifurcated bracket 109 of the clevis assembly. Each bracket 109 is welded or otherwise rigidly affixed to an upstanding arm 110 of a generally U-shaped mounting bracket, indicated generally at 111, and which comprises a platform portion 112 having a downwardly turned flange arm or skirt portion 113 provided with slotted openings 114 receptive of mounting bolts 115 which also pass through the rear skirt portion 57 of the tray table affixing the bracket thereto. To the extent allowed by the slotted openings 114, limited vertical adjustment of the bracket 111 relative to the plane or upper surface of the tray table is permitted whereby to adjust the alignment of the guide rod 70 with the central guide channel 64 of the die body in assembly.

It further will be recognized that the outer threaded ends of the swing bolts 107 are fitted with thumb nuts 116 so that when the clevis bolts are pivoted to their upright position as viewed in FIG. 17, for example, and the thumb nuts tightened down, the bearing assembly 101 is secured in position over hanging the inner end of the guide rod 70. Conversely when it is desired to remove the die means and its associated cover means for cleaning purposes, loosening the the thumb nuts 116 and swinging the clevis swing bolts 107 outwardly, as illustrated in FIG. 17, permits ready disassociation or detachment of the rear bearing assembly 100. This in turn permits the inner end of the guide rod 70 to be lifted along with the die cover means 29 and the die means 28 releasing the outer end of the guide rod 70 from the bearing assembly 90, and vice versa for reassembly.

Figure 3:
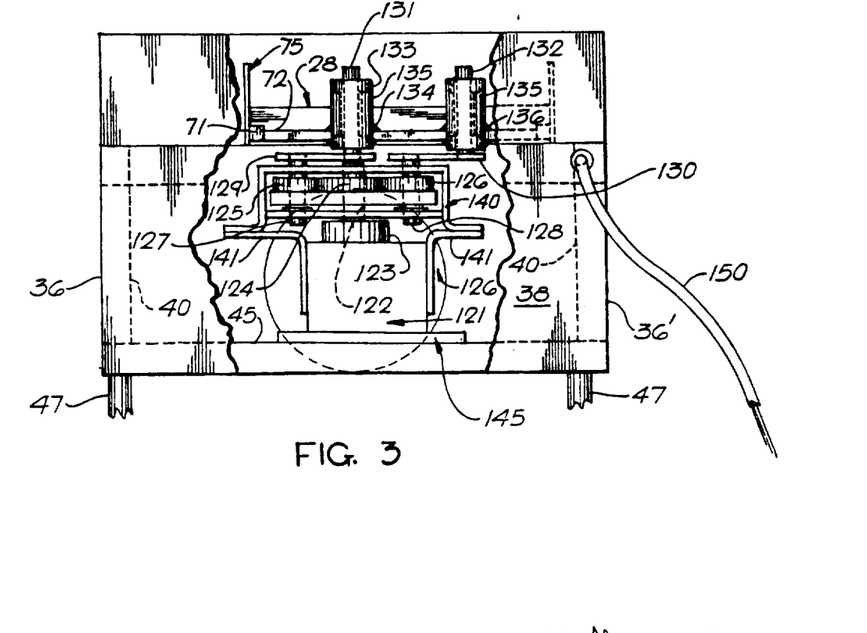
FIG. 3 is a rear elevation thereof.

In order to drive the die assembly and drive yoke as previously mentioned, drive means 31 is provided and to that end reference is now made to FIGS. 3, 4 and 7 of the drawings.

As shown in FIG. 3 in particular, drive means 31 includes an electrically energized motor 120 for driving a fixed or variable speed reducer 121, which drives a vertical output shaft 122 supported in bearing means 123. A pinion 124, keyed to shaft 122, meshes with two additional like sized pinions 125 and 126; each mounted on bearing supported stub shafts 127 and 128 respectively. Drive cranks 129 and 130 are fixed to the outer upper ends of shafts 127, 128; such cranks being of identical size and length and each carrying adjacent their outer end a vertically extending transfer pin 131 and 132, respectively, supported by roller bearings 133 and 134 carried in tubular housings 135 which extend through the enlarged openings 73, 73 of the yoke cross bar 72 and are affixed to said cross bearings as by welded connections 136. The drive gear train comprising gears 124-126 is enclosed in a suitable housing 140 carried by bracket arms 141 fixed to the exterior of the housing for the speed reducer 121. It will be noted that the motor and speed reducer are interconnected by unified casting 142 whereby the motor and the speed reducer are unified so that by supporting the speed reducer 121 on an underdisposed support pedestal 143 attached to the channel member 45 of the machine's housing assembly, both the speed reducer and the motor are rigidly mounted and supported.

The double crank drive means so described will be recognized from FIGS. 5 and 6 in particular. Energization of the motor causes the two crank arms 129 and 130 to rotate in like directions, the drive pins 131 and 132 moving along circular paths as indicated in FIGS. 5 and 6 and in like directions, i.e., counterclockwise as illustrated. Such rotational orbiting of the crank pins causes the yoke assembly 68 to orbit in a circular pattern to effectively drive the die means 28 in a corresponding circular orbit over the table 27 thereby effecting suborbital motion to the several die openings 63 thereof. Such orbiting activity of the several dies causes batches of dough residing therewithin to be formed into a generally spherical ball within each of the dies as regulated by the speed and length of die movement, as well as the frictional engagement of the dough mass with the moveable cover means 29 which move with the dies and the stationary tray table 27, as heretofore noted.

Energization of the motor 120 to actuate the drive means is effected by the depressing of the on/off switch 32 on the front panel of the machine; the motor being electrically supplied over cable conductor 150 as shown in FIGS. 3 and 24. With respect to the latter figure, it will be understood that in addition to switch 32 the control circuit for motor 120 includes a solid state timer or equivalent timing means 151 which is in circuit between the on/off switch 32 and a relay 152 in circuit connection with the supply cable 150 and motor 120. Additionally a safety switch 155 is included in circuit between the supply conductor 150 and the on/off switch 32; such safety switch being normally open and controlling the return side of the circuit such that when switch 155 is opened deenergization of the motor, relay, timer and on/off switch takes place.

It will be recalled that the safety cover 30 which overcovers the tray table, die means and related moving mechanisms, is arranged to effectuate deactivation of the drive means whenever the cover is raised to an open position permitting the access to the die means. Conversely energization of the drive means can take place only when the cover 30 is in its lowered or closed position, as illustrated in FIG. 1.

Figures 21, 22, 23:
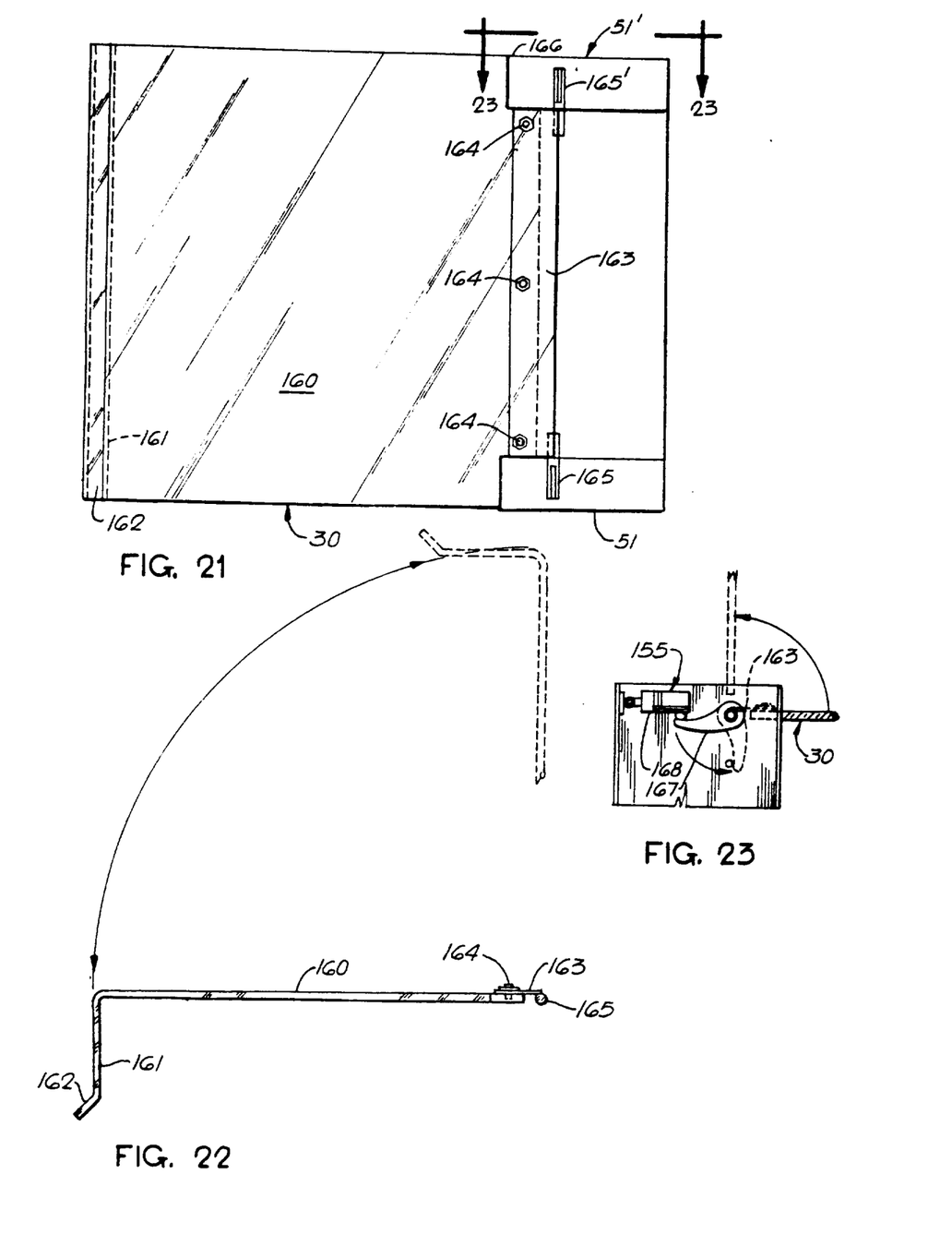
FIG. 21 is a top plan view of the safety cover embodied in the machine of FIG. 1.
FIG. 22 is a side elevation of the safety cover.
FIG. 23 is an enlarged side elevation of the safety switch assembly associated with the safety cover taken substantially from vantage line 23—23 of FIG. 21.

With reference to FIGS. 21-23 of the drawings, the particulars of the safety cover 30 will be understood the as comprising a clear plastic shield of unitary construction having a planar top wall 160 which is folded downwardly adjacent its outer end to provide a front wall 161 normal to top wall 160 and an outwardly turned manually engageable lip 162 at its lower end whereby the operator may engage the lip 162 to raise and lower the cover. At the opposite end of the top wall 160 from the wall 161 and lip 162, hinge leaf 163 is affixed to the trailing edge of the top wall as by bolt fasteners 164, or the like; the hinge leaf 163 comprising a length of sheet metal having fixed to the opposite rear corners thereof coaxially aligned pivots 165, 165' which are suitably bearing supported in bearing means carried within the upright housing 51, 51'. In this manner the cover is supported for hinging or rotational movement about the axis defined by the pivots 165.

The safety switch 155 is located in the housing 51' and is mounted on the inside of outer wall 166 thereof for engagement by an actuator finger 167 affixed to the pivot pin 165' adapted to engage the actuator arm 168 of the switch 155. Thus when the cover is in its lowered position, as shown in full lines in FIG. 23, the safety switch 155 is closed permitting energization of the motor in response to depression of the on/off switch 32. Conversely, raising the cover 30 to its dotted line position, as illustrated in FIG. 23, serves to open switch 155, deenergizing the motor and its control circuit as previously noted.

Having thus described this invention it is believed that those familiar with the art will readily recognize and appreciate the novel advancement thereof over the prior art and although the same has been herein described in association with a preferred embodiment thereof, it is fully contemplated that various changes, modifications and substitutions of equivalents may be resorted to without departing from the spirit and scope of this invention which is intended to be unlimited by the foregoing description except as may appear in the following appended claims.

The embodiments of the invention in which an exclusive property or privilege is claimed are defined as follows:

1. A dough rounder for kneading and shaping a batch of dough, comprising:
   a rigid frame supporting a housing,
   motorized drive means mounted on said frame;
   a horizontal table stationarily supported on said frame;
   die means supported on said table and having driving connection with said drive means;
   said die means comprising at least one open ended, vertically oriented, cylindrical die for confining dough in the open interior thereof, and arranged to be orbitally driven over said table by said drive means; the open lower end of said die being closed by said table on which it is supported; and
   cover means disposed over the open upper end said die for engaging dough confined thereby and arranged to cooperate with said die and table in kneading said dough to a desired texture and density while forming said dough into a generally spherical ball.

2. The combination of claim 1, in which said die means comprises multiple cylindrical dies, each for separately confining dough to be formed therein.

3. The combination of claim 1, wherein said drive means is productive of eccentric motion for driving said die means in an orbital path.

4. The combination of claim 3, and guide means for guiding said die means along mutually perpendicular axes throughout orbital movement thereof.

5. The combination of claim 1, wherein said cover means orbits with said die means and serves to gravitationally load said dough as it is kneaded and formed into a ball.

6. The combination of claim 5, and means mounting said cover means for vertical movement relative to said table and die means whereby said cover means follows changing vertical dimensions of said dough as said dough is kneaded and formed into a ball.

7. The combination of claim 1, and a safety cover enclosing said table, die means and cover means, and means mounting said safety cover for vertical movement between raised and lowered positions.

8. The combination of claim 7 and switch means actuated by said safety cover for deenergizing said motorized drive means when said cover is in raised position.

9. The combination of claim 1 and timer means in circuit with said motorized drive means for restricting energization thereof to selected time intervals.

10. The combination of claim 2, wherein said cover means comprises a plurality of individual cover means, each supported over one of said dies.

* * * * *

UNITED STATES PATENT AND TRADEMARK OFFICE
CERTIFICATE OF CORRECTION

PATENT NO. : 5,277,569

DATED : January 11, 1994

INVENTOR(S) : Richard J. Anetsberger

It is certified that error appears in the above-identified patent and that said Letters Patent is hereby corrected as shown below:

On the Title Page, Item [73], please amend named inventors:
--Richard J. Anetsberger and Danny T. Miller--.

Signed and Sealed this

Twelfth Day of July, 1994

Attest:

BRUCE LEHMAN

Attesting Officer

Commissioner of Patents and Trademarks